United States Patent
Zhang

(10) Patent No.: US 10,706,811 B2
(45) Date of Patent: Jul. 7, 2020

(54) METHOD AND DEVICE FOR CONTROLLING DISPLAY OF A FLEXIBLE DISPLAY SCREEN

(71) Applicant: SHENZHEN ROYOLE TECHNOLOGIES CO., LTD., Shenzhen (CN)

(72) Inventor: Xuan Zhang, Shenzhen (CN)

(73) Assignee: SHENZHEN ROYOLE TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 16/461,230

(22) PCT Filed: Dec. 15, 2016

(86) PCT No.: PCT/CN2016/110067
§ 371 (c)(1),
(2) Date: May 15, 2019

(87) PCT Pub. No.: WO2018/107421
PCT Pub. Date: Jun. 21, 2018

(65) Prior Publication Data
US 2019/0279594 A1     Sep. 12, 2019

(51) Int. Cl.
*G06F 13/16* (2006.01)
*G09G 5/00* (2006.01)
(Continued)

(52) U.S. Cl.
CPC .............. *G09G 5/003* (2013.01); *G06F 1/16* (2013.01); *G06F 1/1652* (2013.01);
(Continued)

(58) Field of Classification Search
CPC .... G09G 2380/02; G09G 2360/14–148; B81B 3/00; H04N 19/129; G06F 1/1613–162; G06F 1/1641; G06F 1/1647
See application file for complete search history.

(56) References Cited

U.S. PATENT DOCUMENTS

2013/0314762 A1* 11/2013 Kwack ...................... G02F 1/09
359/280
2014/0009419 A1* 1/2014 Kim ...................... G06F 3/0412
345/173
(Continued)

FOREIGN PATENT DOCUMENTS

CN    103257838 A    8/2013
CN    104641320 A    5/2015
(Continued)

*Primary Examiner* — Sanghyuk Park
(74) *Attorney, Agent, or Firm* — Hauptman Ham, LLP

(57) ABSTRACT

A method for controlling display of a flexible display screen includes: traversing distance sensors in each detection sequence according to a sequence of the detection sequence, each being a target sensor, and obtaining a front adjacent sensor in front of the target sensor and a rear adjacent sensor in rear of the target sensor in the detection sequence; obtaining a corresponding proximity distance of the target sensor, the front adjacent sensor, and the rear adjacent sensor; when the proximity distance of the target sensor is less than the proximity distance of the front adjacent sensor, and is less than or equal to the proximity distance of the rear adjacent sensor, determining an unfolded position according to the target sensor; and ending the traversal; determining a visible area of the flexible display screen according to the unfolded position, and displaying a corresponding display content on the visible area.

16 Claims, 9 Drawing Sheets

(51) Int. Cl.
*G06F 1/16* (2006.01)
*G06F 3/147* (2006.01)
*G06F 3/0483* (2013.01)
*G09G 3/20* (2006.01)

(52) U.S. Cl.
CPC ............ *G06F 3/0483* (2013.01); *G06F 3/147* (2013.01); *G09G 3/20* (2013.01); *G09G 2330/022* (2013.01); *G09G 2354/00* (2013.01); *G09G 2380/02* (2013.01)

(56) References Cited

U.S. PATENT DOCUMENTS

| | | | |
|---|---|---|---|
| 2014/0028596 A1* | 1/2014 | Seo | G06F 1/1652 |
| | | | 345/173 |
| 2014/0098040 A1 | 4/2014 | Kwon et al. | |
| 2014/0375676 A1* | 12/2014 | Kitatani | G06F 1/1652 |
| | | | 345/620 |
| 2015/0316958 A1 | 11/2015 | Takesue | |
| 2016/0034047 A1* | 2/2016 | Lee | G09G 5/37 |
| | | | 345/156 |

FOREIGN PATENT DOCUMENTS

| | | |
|---|---|---|
| CN | 105074618 A | 11/2015 |
| CN | 105677006 A | 6/2016 |
| TW | 201426545 A | 7/2014 |

* cited by examiner

Page turning by a swipe of the hand

METHOD AND DEVICE FOR CONTROLLING DISPLAY OF A FLEXIBLE DISPLAY SCREEN

RELATED APPLICATION

The present application is a National Phase of International Application Number PCT/CN2016/110067, filed Dec. 15, 2016.

TECHNICAL FIELD

The present disclosure relates to the technical field of a flexible display screen, and more particularly to a method and device for controlling display of a flexible display screen.

BACKGROUND

Currently, common interactive modes of electronic devices include touch and click interaction. With the rise of flexible display screens in recent years, it will bring possibilities of many new gestures, and gesture interactions may be more intuitive and easy to use. Most of the existing flexible display screens use flexible OLED technology, which have bendable, twistable and foldable characteristics, thus a high-resolution and large-sized area and the portability of the devices may be no longer contradictory, durable programs may be also significantly higher than previous screens, and a probability of accidental damage of the device may be reduced.

In a normal state, a flexible display device consumes a large amount of energy, and the greatest electricity component is a flexible display screen. When the flexible display device is turned on, the flexible display screen remains open. When the flexible display screen is partially folded, the folded area is not visible, but the flexible display screen corresponding to the folded area still on, thus consuming power, and increasing the overall energy consumption of flexible display screen.

In addition, the flexible display is turned on not only in a folded state but also in an unfolded state; an executable human-computer interaction mode is relatively monotonous; and the user experience is poor.

SUMMARY

An exemplary embodiment of the present disclosure provides a method for controlling display of a flexible display screen, to solve a technical problem that the flexible display screen consumes a large amount of energy.

A method for controlling display of a flexible display screen, which is performed by a processor; the processor is coupled to a set of distance sensors distributed around side edges of the flexible display screen; the distance sensors are sequentially arranged around the side edges of the flexible display screen to form detection sequences corresponding to the side edges; and the method includes: traversing the distance sensors in each the detection sequence according to a sequence of the detection sequence, each being a target sensor, and obtaining a front adjacent sensor in front of the target sensor and a rear adjacent sensor in rear of the target sensor in the detection sequence;
obtaining a corresponding proximity distance that is a minimum value of distances from the set of distance sensors to each of the target sensor, the front adjacent sensor, and the rear adjacent sensor according to detected distances obtained from the target sensor and the front adjacent sensor and the rear adjacent sensor corresponding to the target sensor; when the proximity distance of the target sensor is less than the proximity distance of the front adjacent sensor, and is less than or equal to the proximity distance of the rear adjacent sensor, determining an unfolded position according to the target sensor; and ending the traversal; and
determining a visible area of the flexible display screen according to the unfolded position, and displaying a corresponding display content on the visible area of the flexible display screen.

In addition, an exemplary embodiment of the present disclosure further provides a device for controlling display of a flexible display screen, including:
a target sensor obtaining unit configured to traverse distance sensors in each detection sequence according to a sequence of the detection sequence, take each one as a target sensor, and obtain a front adjacent sensor in front of the target sensor and a rear adjacent sensor in rear the target sensor in the detection sequence;
an proximity distance obtaining unit configured to obtain a corresponding proximity distance that is a minimum value of distances from the set of distance sensors to each of the target sensor, the front adjacent sensor, and the rear adjacent sensor according to detected distances obtained from the target sensor and the front adjacent sensor and the rear adjacent sensor corresponding to the target sensor;
an unfolded position determination unit configured to, when the proximity distance of the target sensor is less than the proximity distance of the front adjacent sensor, and is less than or equal to the proximity distance of the rear adjacent sensor, determine an unfolded position according to the target sensor; and end the traversal; and
a visible area determination unit configured to determine a visible area of the flexible display screen according to the unfolded position, and display a corresponding display content on the visible area of the flexible display screen.

In the embodiment of the present disclosure, distance sensors are uniformly distributed around side edges or adjacent to the side edges of a flexible display screen. In an unfolded process of the flexible display screen, an unfolded position of an unfolded boundary is obtained by detected distances of the distance sensors, thus determining a visible area of the flexible display screen in the unfolded process. In the unfolded process of the flexible display screen, the visible area is gradually increased by unfolding the flexible display screen, the visible area is correspondingly displayed, the folded part of the flexible display screen is continuously unfolding, the visible area is gradually increased, a corresponding display area is also gradually increased, and a display function of the invisible area can be turned off, thus reducing energy consumption. In addition, a detection of unfolding the visible area can be combined with different functional interfaces, thus improving the user's operating experience.

BRIEF DESCRIPTION OF THE DRAWINGS

In order to more clearly illustrate the technical solution of the present disclosure, the accompanying drawings required for describing the embodiments will be briefly described below. Apparently, the accompanying drawings in the following description are merely the embodiments of the present disclosure, and other drawings may be obtained by those skilled in the art according to these accompanying drawings without paying any creative labor.

DETAILED DESCRIPTION

The technical solutions in the embodiments of the present disclosure will be clearly and completely described below with reference to the accompanying drawings in the embodiments of the present disclosure. Apparently, the described embodiments are merely some but not all of the embodiments of the present disclosure. All other embodiments obtained by a person of ordinary skill in the art based on the embodiments of the present disclosure without creative efforts shall fall within the protection scope of the present disclosure.

In an exemplary embodiment, a method for controlling display of a flexible display screen is provided. An implementation of the method may rely on a computer program. The computer program may be a driver manager or a virtual device manager of the flexible display screen. The computer program can run on a computer system based on a von Neumann Computer system. The computer program can be a terminal device with the flexible display screen, such as a personal computer, a notebook computer, a tablet computer, and a smart phone.

Figure 1:
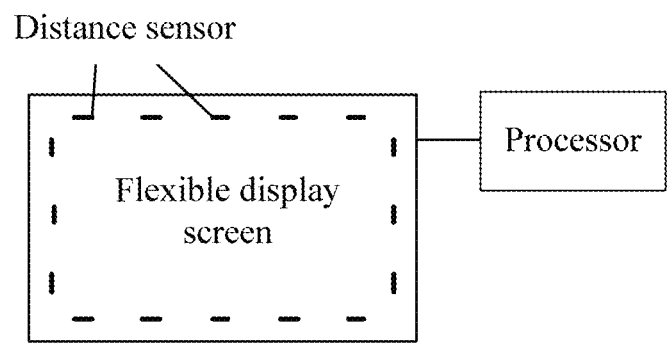
FIG. 1 is a schematic view of a flexible display screen provided by an exemplary embodiment of the present disclosure.

In the embodiment, the flexible display screen may be a transformable and flexible display device made from a soft material. As illustrated in FIG. 1, a schematic view of a flexible display screen is shown. Distance sensors are uniformly distributed around side edges or adjacent to the side edges of the flexible display screen. In the embodiment, FIG. 1 is only a schematic view for briefly introducing the flexible display screen. The number and specific positions of the distance sensors may be determined as necessary, but not limitative. Each of the distance sensors is also named as a displacement sensor, principle being that a physical variation of an object is detected by various elements, and a distance between the detecting sensor and the object is measured by converting the variation into the distance. The distance sensors can be classified into an optical distance sensor, a linear proximity sensor, an ultrasonic distance sensor, and the like according to different components. In the embodiment, the optical distance sensor is taken as an example to illustrate the method. A signal transmitting end of the distance sensor transmits a pulsed infrared light signal to other distance sensors, records the time it takes to transmit the light pulses and have the light pulses received, thus detecting a distance from other distance sensors.

Figure 2:
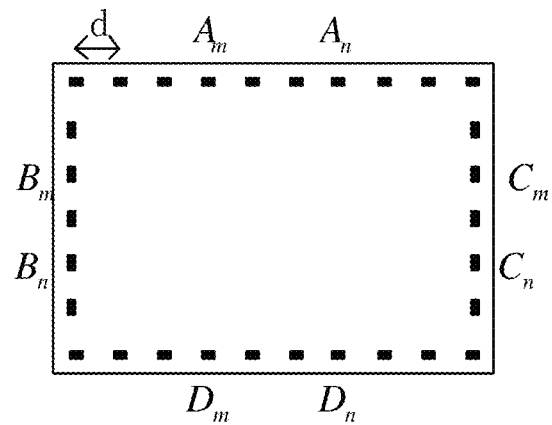
FIG. 2 is a schematic view of a flexible display screen provided by an exemplary embodiment of the present disclosure.

The processor is coupled to a set of distance sensors distributed around side edges of the flexible display screen, and the distance sensors is sequentially arranged on the side edges of the flexible display screen to form detection sequences corresponding to the side edges. When the distance sensors are arranged on the flexible display, the processor may record a position and sequence number of each of the distance sensors, and a distance between adjacent distance sensors can be the same or different. As illustrated in FIG. 2, in the embodiment, FIG. 2 is a schematic view of the distance sensors arranged on the flexible display screen. In the embodiment, the flexible display screen is rectangular. In other embodiments, the flexible display screen may also be polygonal, circular, elliptical, and the like.

In the embodiment, four sides of the flexible display screen are respectively defined as A, B, C, and D, and the distance sensors on each side are sequentially numbered, for example, $A_1, A_2, \ldots, A_{m-1}, A_m, A_{m+1}, \ldots, A_{n-1}, A_n, A_{n+1}, \ldots, B_1, B_2, \ldots, B_{m-1}, B_m, B_{m+1}, \ldots, B_{n-1}, B_n, B_{n+1}, \ldots$, and a distance between two adjacent distance sensors is set to d.

Figure 3:
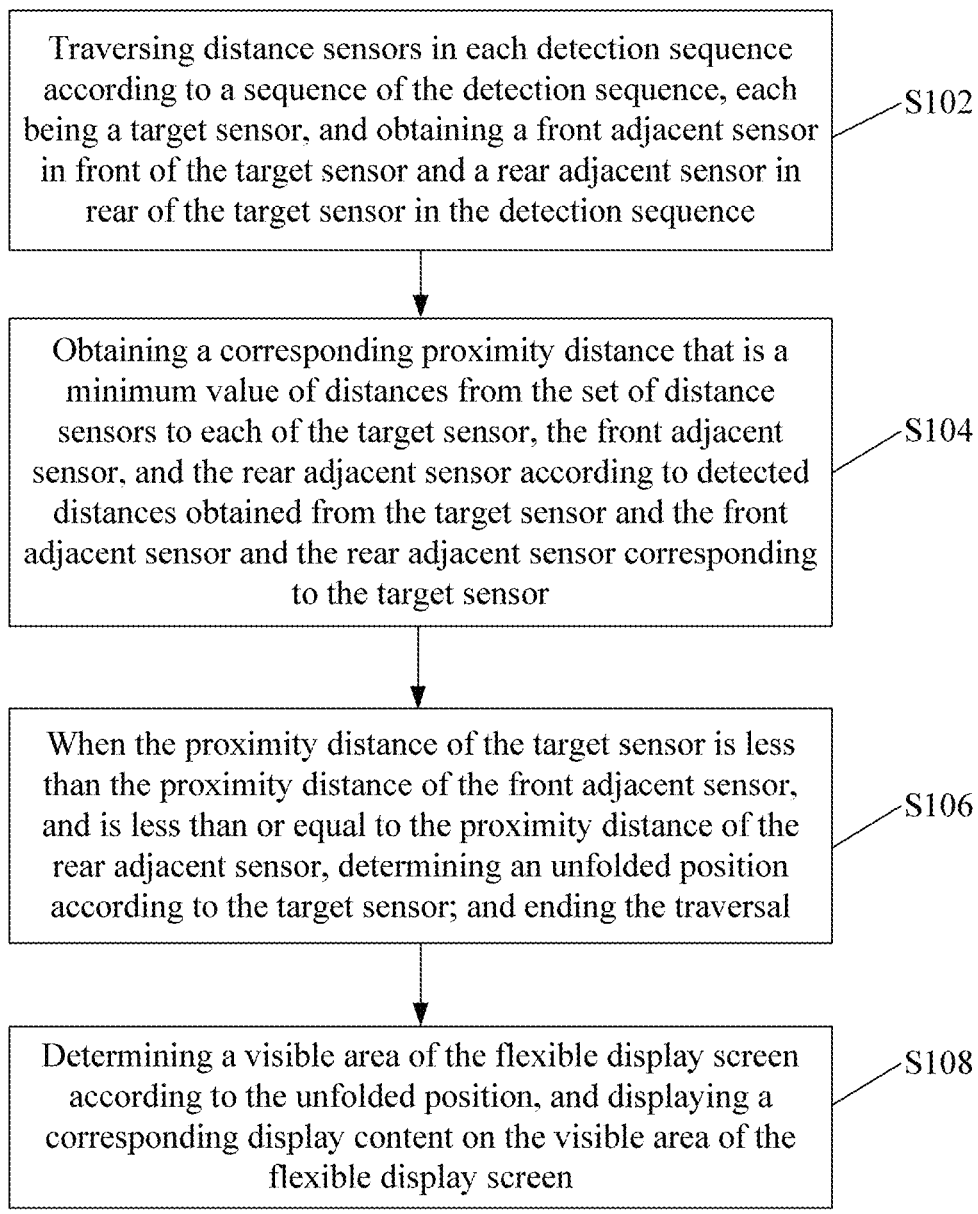
FIG. 3 is a flowchart of a method for controlling display of a flexible display screen provided by an exemplary embodiment of the present disclosure.

As illustrated in FIG. 3, FIG. 3 is a flowchart of a method for controlling display of a flexible display screen provided by an exemplary embodiment, and the method includes the following steps.

At block S102, distance sensors in each detection sequence are traversed according to a sequence of the detection sequence. Each one is taken as a target sensor. A front adjacent sensor in front of the target sensor and a rear adjacent sensor in rear of the target sensor are obtained in the detection sequence.

That is, the side A of the flexible display screen is taken as an example to illustrate the method. The processor sequentially detects $A_1, A_2, \ldots, A_{m-1}, A_m, A_{m+1}, \ldots, A_{n-1}, A_n, A_{n+1}, \ldots$, of the distance sensors. When the $A_m$ is detected, the $A_m$ is a target sensor, the $A_{m-1}$ is the front adjacent sensor, and the $A_{m+1}$ is the rear adjacent sensor.

At block S104, a corresponding proximity distance that is a minimum value of distances from the set of distance sensors to each of the target sensor, the front adjacent sensor, and the rear adjacent sensor is obtained according to detected distances obtained from the target sensor and the front adjacent sensor and the rear adjacent sensor corresponding to the target sensor.

Each distance sensor may detect distances relative to the other distance sensors, and select the minimum value from the distances as a proximity distance of the distance sensor. It should be noted that, within the protection scope of the solution of the present disclosure, the flexible display screen is unfolding in a folded state, and the minimum value of the distances detected by the target sensor, the front adjacent sensor, and the rear adjacent sensor in a folded position is less than a distance d between distance sensors. When the minimum value of the distances detected by the distance sensor in the folding position is equal to the distance d, which does not belong to a condition that the flexible display screen is unfolding in the folded state, thus not performing the above method.

Figure 4:
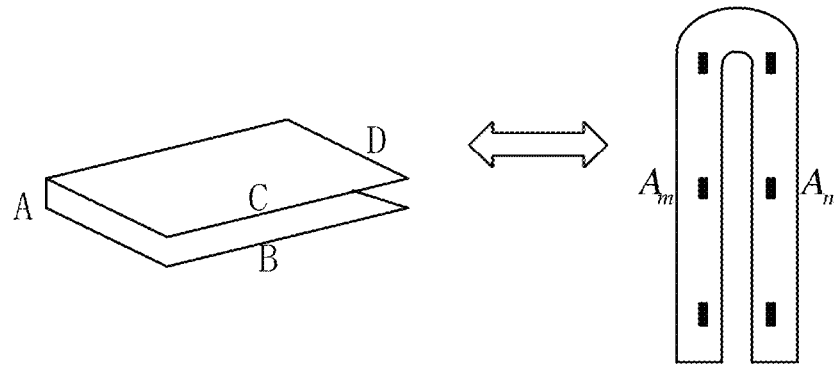
FIG. 4 is a schematic view of a flexible display screen in a folded state provided by an exemplary embodiment of the present disclosure.
Figure 5:
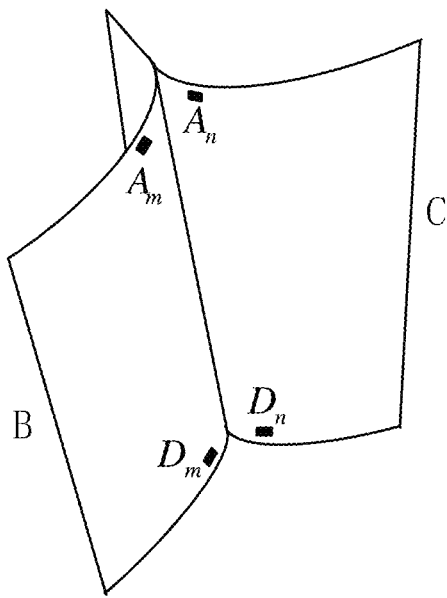
FIG. 5 is a schematic view of a flexible display screen in a partially unfolded state provided by an exemplary embodiment of the present disclosure.

When the flexible display screen is folded, proximity distances detected by some of distance sensors may change. For example, as illustrated in FIG. 4, when the flexible display screen is folded along the side A, the side B of the flexible display screen coincides with the side C of the flexible display screen. At this time, the proximity distances detected by the overlapped distance sensors are 0, or when a gap in a folded state of the flexible display panel is greater than 0, there is still a fixed proximity distance corresponding to the minimum value of the distances that is a minimum distance when the flexible display screen is folded. In the following discussion, the minimum distance is defined as $d_0$, such as 0.1 mm. For another example, when a partial area of the flexible display panel is folded, as illustrated in FIG. 5, partial areas along the side A and the side D are overlapped, and the proximity distances detected by the overlapped distance sensors are $d_0$. For the distance sensors (here is $A_m$ and $A_n$) at a critical point adjacent to the folded portion, when a distance s between $A_m$ and $A_n$ is smaller than the preset distance d between the distance sensors, the proximity distance detected by $A_m$ and $A_n$ is the distance s between $A_m$ and $A_n$. According to preset number sequences, it is determined whether the proximity distance detected by the distance sensors $A_m$ and $A_n$ adjacent to both sides of the side edge of the flexible display screen is different from the proximity distance in an initial state, thus the proximity distance detected by each distance sensor can be detected to determine whether the flexible display screen has been unfolded.

Figure 6:
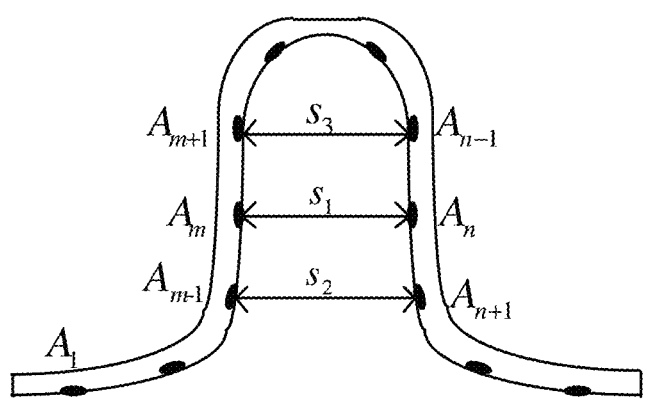
FIG. 6 is a schematic view of a flexible display screen provided by an exemplary embodiment of the present disclosure.

As illustrated in FIG. 6, FIG. 6 is a schematic view of the distance sensors. The preset distance d between the distance sensors is larger than the proximity distance between the distance sensors. At this time, the processor traverses the distance sensor $A_m$ as the target sensor in the detection sequence of the side A. When the flexible display screen is folded, the distance sensor closest to the distance sensor $A_m$ is $A_n$, and the distance between the distance sensor $A_n$ and the distance sensor $A_m$ is the proximity distance of $A_m$ and $A_n$. When the distance between the distance sensor $A_m$ and the distance sensor $A_n$ is $s_1$, and the preset distance d between the distance sensors is larger than the proximity distance between the distance sensors $A_m$ and $A_n$, such as d=10 mm, $s_1$=1 mm, and the proximity distance detected by the $A_m$ is $s_1$. The front adjacent sensor in front of the distance sensor $A_m$ is $A_{m-1}$. When the flexible display screen is folded, the distance sensor corresponding to the distance sensor $A_{m-1}$ is $A_{n+1}$. A distance between the distance sensor $A_{m-1}$ and the distance sensor $A_{n+1}$ is $s_2$, and the proximity distance detected by the $A_m$ is $s_2$. The rear adjacent sensor in back of the distance sensor $A_m$ is $A_{m+1}$. When the flexible display screen is folded, the distance sensor corresponding to the distance sensor $A_{m+1}$ is $A_{n-1}$. A distance between the distance sensor $A_{m+1}$ and the distance sensor $A_{n-1}$ is $s_3$, and the proximity distance detected by the $A_{m+1}$ is $s_3$.

Therefore, the proximity distance of the target sensor $A_m$ is $s_1$. The proximity distance of the front adjacent sensor $A_{m-1}$ in front of the $A_m$ is $s_2$. The proximity distance of the rear adjacent sensor $A_{m+1}$ in back of the $A_m$ is $s_3$.

At block S106, when the proximity distance of the target sensor is smaller than the proximity distance of the front adjacent sensor, and is less than or equal to the proximity distance of the rear adjacent sensor, an unfolded position is determined according to the target sensor, and the traversal is ended.

Figure 7:
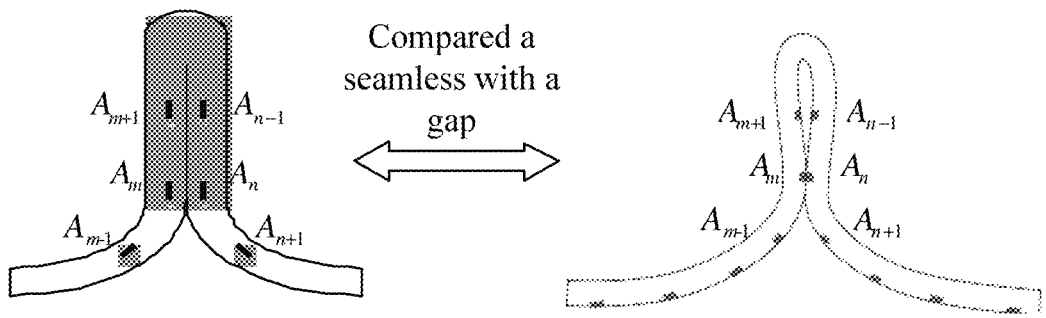
FIG. 7 is a schematic view of a flexible display screen provided by an exemplary embodiment of the present disclosure.

That is, in the above embodiment, when $s_1<s_2$ and $s_1 \leq s_3$, it is determined that the distance sensor $A_m$ and the distance sensor $A_n$ are located at the unfolded positions of the folded flexible display screen. As illustrated in FIG. 7, an unfolded process of the folded flexible display screen without gaps is illustrated at left in FIG. 7, and the folded areas are completely overlapped, at this time, $s_1=s_3$. An unfolded process of the folded flexible display screen with gaps is illustrated at right in FIG. 7, and a gap is formed in the folded part of the flexible display screen, at this time, $s_1<s_3$.

At block S108, a visible area of the flexible display screen is determined according to the unfolded position, and a corresponding display content is displayed on the visible area of the flexible display screen.

In the embodiment, a first unfolded position where the target sensor is located among the detection sequence is obtained, and a second unfolded position where a distance sensor corresponding to the proximity distance of the target sensor is located among the detection sequence of the corresponding distance sensor is obtained.

In above embodiment, a position of the distance sensor $A_m$ (represented by the number m) is the first unfolded position, and a position of the distance sensor $A_n$ (represented by the number n) is the second unfolded position.

Figure 8:
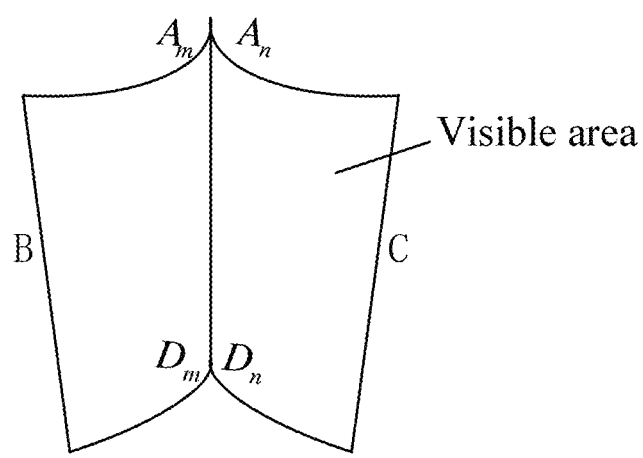
FIG. 8 is a schematic view of a visible area of a flexible display screen provided by an exemplary embodiment of the present disclosure.

When the flexible display screen in a folded state is unfolded, unfolded positions are formed on the two sides. The distance sensor $A_m$ and the distance sensor $A_n$ are located at the first unfolded position and the second unfolded position, respectively. Correspondingly, when an unfolded area of the flexible display screen is a quadrilateral, the corresponding target sensors can also be found on the side D by the above method, that is, the distance sensor $D_m$ and the distance sensor $D_n$ are located at the first unfolded position and the second unfolded position, respectively as illustrated in FIG. 8. A connecting line between the two unfolded positions is a connecting line between the distance sensor $A_m$ (or the distance sensor $A_n$) and the distance sensor $D_m$ (or the distance sensor $D_n$), that is a unfolded boundary of the flexible display screen.

In the embodiment, the target sensor and the distance sensor corresponding to the proximity distance may be located in the same detection sequence. For example, for a rectangular flexible display screen, still taking FIG. 5 as an example, the target sensor is $A_m$, the distance sensor corresponding to the proximity distance is $A_n$, and both are located on the side A. Similarly, the distance sensor $D_m$ and the distance sensor $D_n$ in the figure are located in the same detection sequence.

In another embodiment, a target sensor and a distance sensor corresponding to the proximity distance may be located in different detection sequences. For example, in FIG. 9, the target sensor is $A_m$. The distance sensor corresponding to the proximity distance is $A_n$. Both the target sensor $A_m$ and the distance sensor $A_n$ are located on the side A. The target sensor is $B_m$. The distance sensor corresponding to the proximity distance is $C_m$. The target sensor $B_m$ is located on the side B, and the distance sensor $C_m$ is located on the side C. For another example, when the flexible display screen is square, the flexible display screen is folded diagonally. At this case, one group of the unfolding positions is correspondingly located on the side A and the side B, and the other group of the unfolded positions is correspondingly located on the side C and the side D.

In the embodiment, a first unfolded boundary is determined according to the first unfolded position. The second unfolded boundary is determined according to the second unfolded position. The first unfolded boundary is disjoint from the second unfolded boundary. A first visible area of the flexible display screen is determined, which is enclosed by the first unfolded boundary and the side edges of the flexible display screen. A second visible area of the flexible display screen is determined, which is enclosed by the second unfolded boundary and the side edges of the flexible display screen. The first visible area does not overlap with the second visible area.

When the target sensor and the distance sensor corresponding to the proximity distance are located in the same detection sequence, for example, as illustrated in FIG. 8, there are two groups of unfolded positions, that is, the first unfolded positions arrange the distance sensor $A_m$ on the side A and the distance sensor $D_m$ on the side D, respectively; and second unfolded positions arrange the distance sensor $A_n$ on the side A and the distance sensor $D_n$ on the side D, respectively. In the embodiment, a connecting line between the first unfolded positions is a connecting line between the $A_m$ and the $D_m$, which is the first unfolded boundary. A connecting line between the second unfolded positions is a connecting line between the $A_n$ and the $D_n$, which is the second unfolded boundary. The first unfolded boundary is disjoint from the second unfolded boundary. A first visible area is enclosed by the first unfolded boundary that the connecting line between the $A_m$ and the $D_m$, and the sides A, B, and D of the flexible display screen. A second visible area is enclosed by the second unfolded boundary that the connecting line between the $A_n$ and the $D_n$, and the sides A, C, and D of the flexible display screen. The first visible area does not overlap with the second visible area.

For example, 20 distance sensors are arranged on the side A and the side D, respectively, which are numbered 1-20. $A_1$ and $D_1$ are the distance sensors closest to the side B. $A_{20}$ and $D_{20}$ are the distance sensors closest to the side C. The first unfolded positions arrange $A_5$ and $D_5$, and the second unfolding positions arrange $A_{16}$ and $D_{16}$. The visible areas are the area enclosed by the connecting line between $A_5$ and $D_5$ and the sides A, B, and D, and the area enclosed by the connecting line between $A_{16}$ and $D_{16}$ and the sides A, C, and D.

Figure 9:
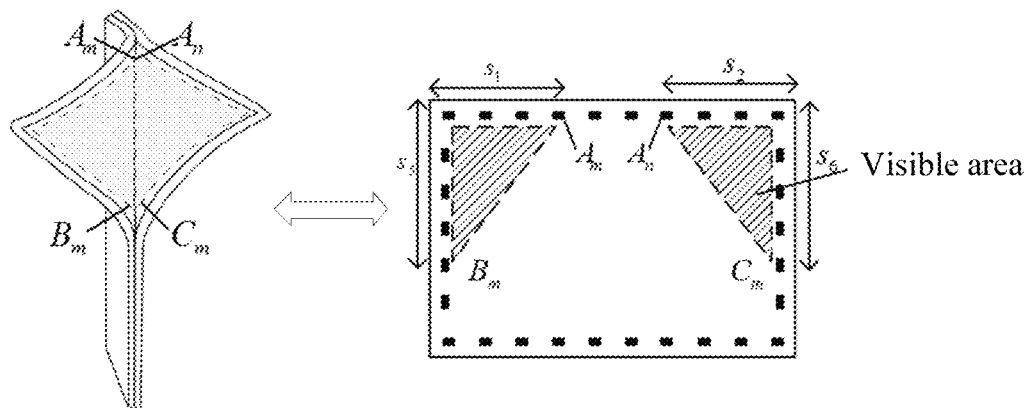
FIG. 9 is a schematic view of a visible area of a flexible display screen provided by an exemplary embodiment of the present disclosure.

When the target sensor and the distance sensor corresponding to the proximity distance are located in different detection sequences, for example, as illustrated in FIG. 9, the first unfolded position of the $A_m$ and the second unfolded position of the $A_n$ are the same as the above case. The first unfolded position located at the side B arranges the distance sensor $B_m$, and the second unfolded position located at the side C arranges the distance sensor $C_m$. At the side B, a numbering sequence of the distance sensors is $B_1, B_2, \ldots, B_m, \ldots$ . The numbering sequence is the same as the traversed sequence in the detection. At the side C, a numbering sequence of the distance sensors is $C_1, C_2, \ldots, C_m, \ldots$ . The numbering sequence is the same as the traversed sequence in the detection. At this time, in the embodiment, a connecting line between the first unfolded positions, that is a connecting line between the $A_m$ and the $B_m$, is a first unfolded boundary. A connecting line between the second unfolded positions, that is a connecting line between the $A_n$ and the $C_m$, is a second unfolded boundary. The first unfolded boundary is disjoint from the second unfolded boundary. A first visible area is determined, which is enclosed by the first unfolded boundary connecting the $A_m$ and the $B_m$, and the sides A and B of the flexible display screen. A second visible area is determined, which is enclosed by the second unfolded boundary connecting the $A_n$ and the $C_m$, and the sides A and C of the flexible display screen. The first visible area does not overlap with the second visible area.

For example, 20 distance sensors are respectively arranged on the sides A, B and C, which are numbered 1-20 in sequence. $A_1$ is a distance sensor closest to the side B. $A_{20}$ is a distance sensor closest to the side C. $B_1$ and $C_1$ are distance sensors closest to the side A. $B_{20}$ and $C_{20}$ are distance sensors closest to the side D. The first unfolded positions arrange $A_6$ and $B_5$, and the second unfolding positions arrange $A_{14}$ and $C_5$. The visible areas are the area enclosed by a connecting line between the $A_6$ and the $B_5$, and the sides A and B, and the area enclosed by a connecting line between the $A_{14}$ and the $C_5$, and the sides A and C.

It should be noted that, in the embodiment, the sequence of the numbers may be in ascending or descending order, providing that the sequence follows a certain order. After finding the first unfolded position and the second unfolded position according to the certain order, the first unfolded boundary is determined according to two first unfolded positions of the two groups of unfolded positions, and the second unfolded boundary is determined according to two second unfolded positions of the two groups of unfolded positions. It is not limited to the examples provided in the embodiments of the present disclosure, and the first unfolding boundary and the second unfolding boundary may also be determined by the following methods providing that the first unfolding boundary is disjoint from the second unfolding boundary. The visible areas include the area enclosed by the first unfolded boundary and first side edges of the flexible display screen, and the area enclosed by the second unfolded boundary and second side edges of the flexible display screen, the first side edges and the second side edges of the flexible display screen being selected preferably such that the first side edges and the second side edges respectively includes intersects and may form an enclosed area with the first unfolded boundary and the second unfolded boundary.

In an exemplary embodiment, when the first unfolded position is less than a first sequence position threshold, it is determined that the first unfolded position is invalid. Taking FIG. 5 and FIG. 6 as an example again, the target sensor is $A_m$, and the distance sensor corresponding to the proximity distance is $A_n$. When the first unfolded position arranging $A_m$ is close to the side B, the edge of the flexible display screen may be slightly bent due to misoperation, and may not need to display content. At this time, a threshold is set to ignore the misoperation. For example, a distance sensor has a proximity distance of 5 mm, and a first threshold is set to be 10 mm. When the distance between the first unfolded position arranging $A_m$ and the side B is less than 10 mm, it is determined that the first unfolded position detected at this time is invalid, thus avoiding lightening the flexible display screen due to the misoperation, and decreasing power consumption.

Correspondingly, in an exemplary embodiment, when the second unfolded position is less than a second sequence position threshold, it is determined that the second unfolded position is invalid. Taking FIG. 5 and FIG. 6 as an example again, the target sensor is $A_m$, and the distance sensor corresponding to the proximity distance is $A_n$. When the second unfolded position arranging $A_n$ is close to the side C, the edge of the flexible display screen may be slightly bent due to the misoperation, and may not need to display content. At this time, a threshold is set to ignore the misoperation. For example, a distance sensor has a proximity distance of 5 mm, and the set second threshold is set to be 10 mm. When a distance between the second unfolded position arranging $A_m$ and the side C is less than 10 mm, it is determined that the second unfolded position detected at this time is invalid, thus avoiding lighting the flexible display screen due to the misoperation, and decreasing power consumption. In another exemplary embodiment, when the distance sensor corresponding to the proximity distance of the front adjacent sensor is not the target sensor, it is determined that whether the proximity distance of the front adjacent sensor is greater than the distance threshold, and if so, the step of determining the unfolded position according to the target sensor is performed. Taking FIG. 6 as an example, when the distance sensor $A_m$ is the target sensor, the front adjacent sensor is $A_{m-1}$. When the distance between the distance sensors $A_m$ and $A_{m-1}$ is large than the proximity distance between the distance sensors. A distance sensor corresponding to the proximity distance of the front adjacent sensor $A_{m-1}$ is $A_{n+1}$. When the distance $s_2$ of $A_{m-1}$ and $A_{n+1}$ is greater than the preset distance threshold, the step of determining the unfolded position according to the target sensor is performed. When the distance $s_2$ is less than the preset distance threshold, an unfolded distance of the flexible display screen is relatively small, which may be caused by misoperation. By using the method for determination, the flexible display screen may be kept from being lightened due to misoperation, thus decreasing power consumption.

In an exemplary embodiment, when the distance sensor corresponding to the proximity distance of the front adjacent sensor is not the target sensor, an unfolded angle is calculated according to the proximity distance of the front adjacent sensor and the distance between the front adjacent sensor and the target sensor. When the unfolded angle is greater than an angle threshold, the step of determining the unfolded position according to the target sensor is performed. For example, the unfolded angle threshold is set to be 10°, and the calculated unfolded angle is 8°. When the unfolded angle is less than the preset unfolded angle threshold, it is determined that the unfolded operation belongs to misoperation, thus avoiding lighting the flexible display screen due to the misoperation, and decreasing power consumption.

The unfolded angle of the flexible display screen expands can be calculated by the following steps.

Figure 10:
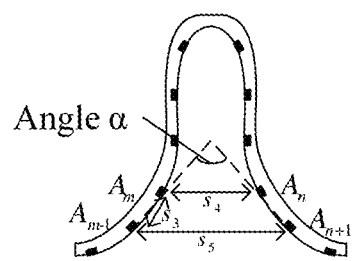
FIG. 10 is a schematic view of a flexible display screen in a partially unfolded state provided by an exemplary embodiment of the present disclosure.

As illustrated in FIG. 10, the distance sensor $A_m$ and the distance sensor $A_n$ are located at the unfolded points, and a distance between them is $s_4$. A distance between the adjacent distance sensor and the distance sensor $A_{n+1}$ is $s_5$. A distance between the distance sensor $A_{m-1}$ and the distance sensor $A_m$ is $s_3$. The unfolded angle α of the flexible display screen is calculated as:

$$\alpha = 2\arcsin\left(\frac{s_5 - s_4}{2s_3}\right).$$

Figure 11:
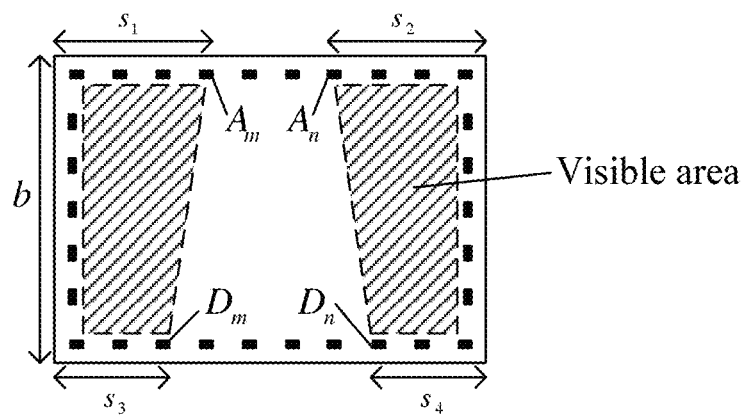
FIG. 11 is a schematic view of a visible area of a flexible display screen provided by an exemplary embodiment of the present disclosure.

In an exemplary embodiment, when the area of the visible area on the flexible display screen is calculated, and the area of the visible area is greater than or equal to a preset area threshold, the content corresponding to an unfolded operation is displayed on the visible area of the flexible display screen. The area computing method of the visible area of the flexible display screen varies with different shapes of the visible area. When the flexible display screen is folded along the side A and the side D, as illustrated in FIG. 11, the visible area is trapezoidal. The length of each of the side B and the side C of the flexible display screen is b, and the unfolded points arrange the distance sensors $A_m$, $A_n$, $D_m$, and $D_n$. A distance between the distance sensor $A_m$ and the side B is $s_1$. A distance between the distance sensor $A_n$ and the side C is $s_2$. A distance between the distance sensor $D_m$ and the side B is $s_3$. A distance between the distance sensor $D_n$ and the side C is $s_4$. The area of the visible area is calculated as:

$$S_1 = \frac{(s_1 + s_3) \times b}{2};$$

$$S_2 = \frac{(s_2 + s_4) \times b}{2}.$$

When the flexible display screen is folded along the side A, the side B, and the side C, as illustrated in FIG. 9, the visible area is substantially a triangle, and the unfolded points arrange the distance sensors $A_m$, $A_n$, $B_m$, $C_m$. A distance between the side B and the distance sensor $A_m$ is $s_1$. A distance between the side C and the distance sensor $A_n$ is $s_2$. A distance between the side D and the distance sensor $B_m$ is $s_5$. A distance between the side D and the distance sensor $C_m$ is $s_6$. The area of the visible area is:

$$S_3 = \frac{s_1 \times s_5}{2};$$

$$S_4 = \frac{s_2 \times s_6}{2}.$$

It should be noted that, in an actual condition, the shape of the visible area and the corresponding calculating method of the area are not limited to the examples given in the embodiment.

Figure 12:
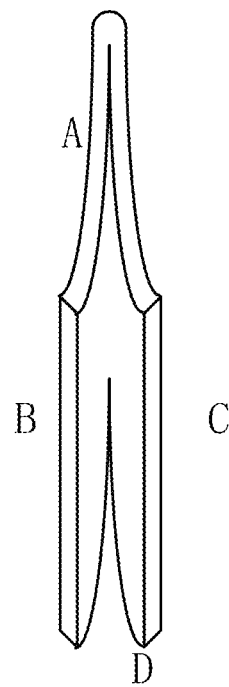
FIG. 12 is a schematic view of a flexible display screen in a partially unfolded state provided by an exemplary embodiment of the present disclosure.

In an exemplary embodiment, after calculating the area of the visible area, when the area of the visible area is smaller than a preset area threshold, it is determined that the unfolding operation is invalid for the flexible display screen, and the corresponding content is not displayed on the flexible display screen. For example, as illustrated in FIG. 12, an unfolded area of the flexible display screen is smaller than a preset area threshold which is assumed to be 5 cm$^2$, and the unfolded area of the visible area at this time is 0.5 cm$^2$, which is smaller than the preset area threshold. The unfolded operation at this time is an invalid operation, thus eliminating the unfolding of the flexible display screen due to the misoperation, and thereby avoiding power loss caused by lighting up the flexible display screen.

Figure 13:
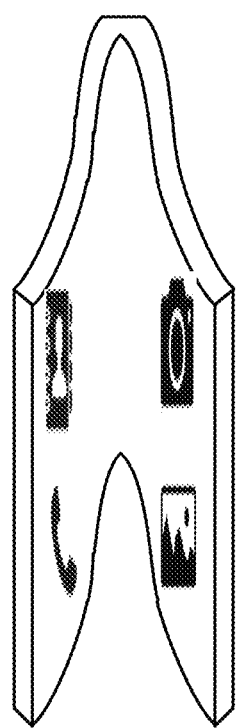
FIG. 13 is a schematic view of a display interface in a partially unfolded state of a flexible display screen provided by an exemplary embodiment of the present disclosure.
Figure 14:
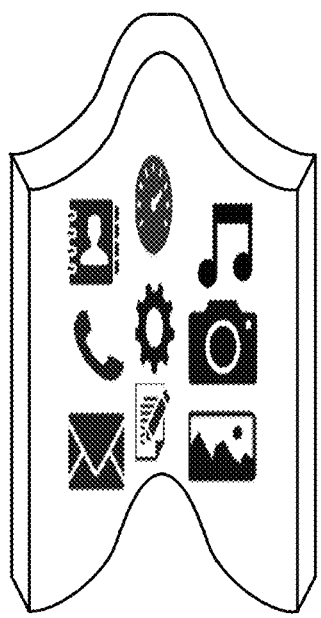
FIG. 14 is a schematic view of a display interface in a partially unfolded state of a flexible display screen provided by an exemplary embodiment of the present disclosure.
Figure 15:
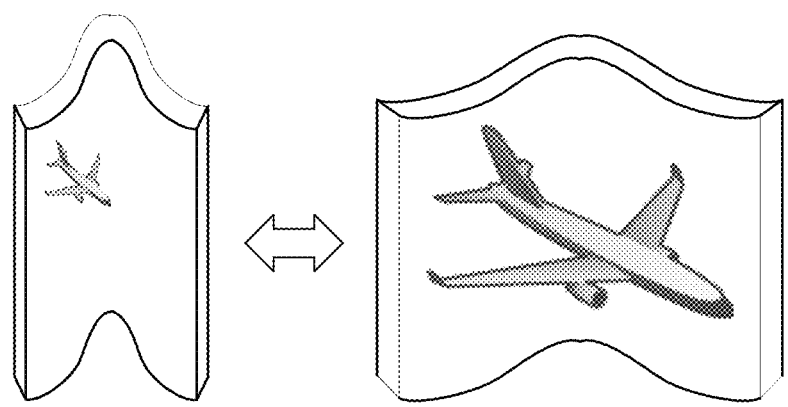
FIG. 15 is a schematic view of a display interface in a partially unfolded state of a flexible display screen provided by an exemplary embodiment of the present disclosure.
Figure 16:
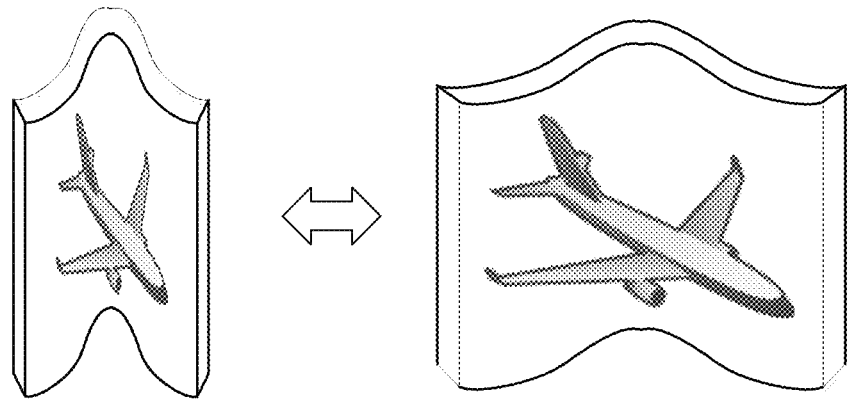
FIG. 16 is a schematic view of a display interface in a partially unfolded state of a flexible display screen provided by an exemplary embodiment of the present disclosure.

When the detected area of the visible area is greater than a preset threshold, different display contents may be preset according to different area sizes. When the area of the visible area is within a certain range, the recommended display content may be a menu, a control panel, a content of an extended current page or a control member manipulating the current page. When the area of the visible area is larger than the certain range, the recommended display content may be a graphic card, a text box, a comment area, a page content of an up level of the current page, a page content of a low level of the current page, and the like. For example, as illustrated in FIG. 13, when the area of the visible area is small, only a few icons, and basic applications such as a call function are displayed. As illustrated in FIG. 14, when the area of the visible area is large, the number of icons displayed on the flexible display screen increases. In another exemplary embodiment, in the same application, the flexible display screen may display different contents with the change of the area of the visible area. Taking a common photo album function as an example, when the visible area is relatively small, a thumbnail of a photo is displayed; when the area of the view area is relatively large, a clear image of a specific photo is displayed, as illustrated in FIG. 15. In further another exemplary embodiment, when the flexible display screen is unfolded to change the visible area, the displayed picture may have different deformation effects as the gesture changes, as illustrated in FIG. 16. According to the size of different visible areas, different content can be displayed, thus increasing the diversity in the use of flexible display, and thereby enriching the display content.

In another exemplary embodiment, according to the time it takes to change the area of the visible area, different contents can be displayed by calculating a rate of change of the visible area. For example, when an unfolding operation of the flexible display screen becomes faster, a browsing speed of replacing pictures may also become faster correspondingly. When the unfolding operation of the flexible display screen becomes slower, the browsing speed of replacing the pictures may also become slower correspondingly, thus enriching an operation of the flexible display screen.

Figure 17:
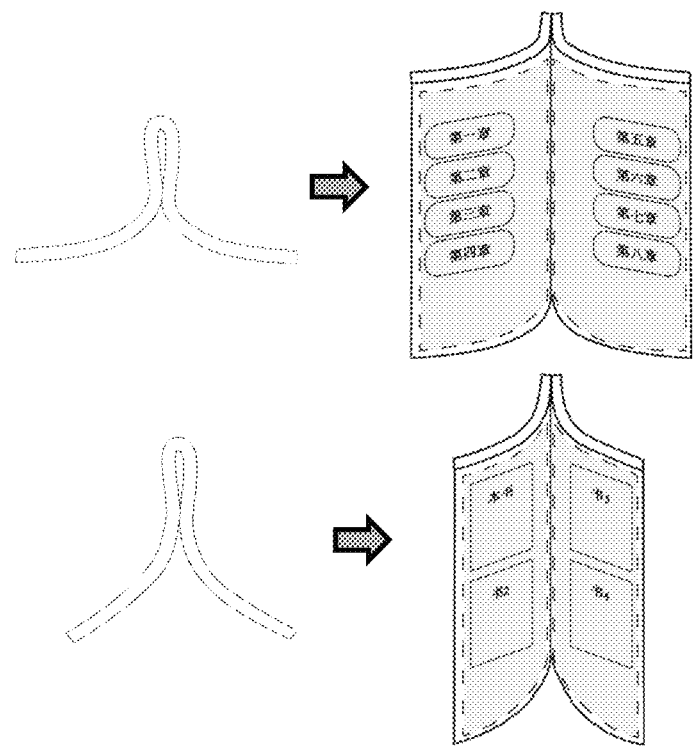
FIG. 17 is a schematic view of a flexible display screen in a partially unfolded state provided by an exemplary embodiment of the present disclosure.

In an exemplary embodiment, different display contents can also be set according to an unfolded angle α of the flexible display screen. As illustrated in FIG. 17, the current application is an e-book reader. When the unfolded angle α of the flexible display screen is small relatively, such as α=60°, different books recently read are displayed and a page skip is performed in response to finger clicking. When the unfolded angle α of the flexible display screen is large relatively, such as α=120°, a chapter content of the book is displayed. According to different unfolded angles, different contents can be displayed, thus increasing the diversity in the use of flexible display screen, and enriching the display content.

In another exemplary embodiment, according to the time it takes to unfold the flexible display screen at a preset angle, different contents can be set by calculating a rate of changing the unfolded angle of the flexible display screen. For example, on an e-book reader interface, when the angle changes fast relatively, a page-turning speed of the current reading interface is also fast relatively. On the e-book reader interface, when the angle changes slow relatively, the page-turning speed of the current reading interface is also slow relatively. For another example, when the angle changes fast relatively, fonts of the current reading interface are enlarged. On the e-book reader interface, when the angle changes slow relatively, the fonts of the reading interface is reduced.

In another exemplary embodiment, a page-turning direction may also be set according to different change trends of the angle. For example, when the angle of the visible area is gradually increased, the page is turned backwards; when the angle of the visible area is gradually decreased, the page is turned forwards.

Figure 18:
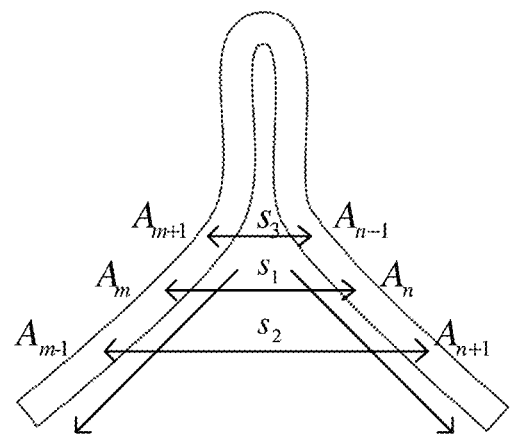
FIG. 18 is a schematic view of a flexible display screen in a partially unfolded state provided by an exemplary embodiment of the present disclosure.

In one exemplary embodiment, different display contents can also be set according to an unfolded curvature of the flexible display screen. As illustrated in FIG. 18, according to the detected distance $s_1$ between the $A_m$ and the $A_n$, the detected distance $s_2$ between the $A_{m-1}$ and the $A_{n+1}$, and the detected distance $s_3$ between the $A_{m-2}$ and the $A_{n+2}$, whether $s_1$, $s_2$, and $s_3$ are changed in a linear trend is determined, and a curvature of the visible area is calculated, thus displaying different display contents. For example, $s_1$=4 mm, $s_2$=6 mm, $s_3$=8 mm. After obtaining the $s_1$, $s_2$, and $s_3$ by the processor, it is determined that $s_1$, $s_2$, and $s_3$ are changed in a linear fashion. It is assumed that the preset display content corresponding to the linear-fashion trend corresponds to enlarging fonts on the flexible display screen, and the display content corresponding to a certain curvature corresponds to zooming fonts on the flexible display screen according to the curvature, then the displayed fonts on the flexible display screen is enlarged. Different display contents are displayed in response to determining different curvatures of the visible area, thus increasing the diversity in the use of the flexible display screen, and enriching the displayed contents.

In an exemplary embodiment, the processor presets display contents for different shapes (such as rectangle, and triangle) of the visible area according to the current application interface. The display contents may include a control, a directory, a content window, a status window, and the like, which are not limitative. When an unfolded gesture is detected, different contents are displayed according to the current interface and the determined visible area. When the visible area is a triangular area, a separate and simple control may be displayed appropriately, such as an operation button, a selector. When the visible area is a long strip area, a list of a menu directory, a text box, and an app quick entry, a status bar, and the like can be displayed. When the visible area is a large square area, more complex interfaces can be displayed, such as a widget, a graphic card, a complicated control panel, a video player, an interface of a second application.

Figure 19:
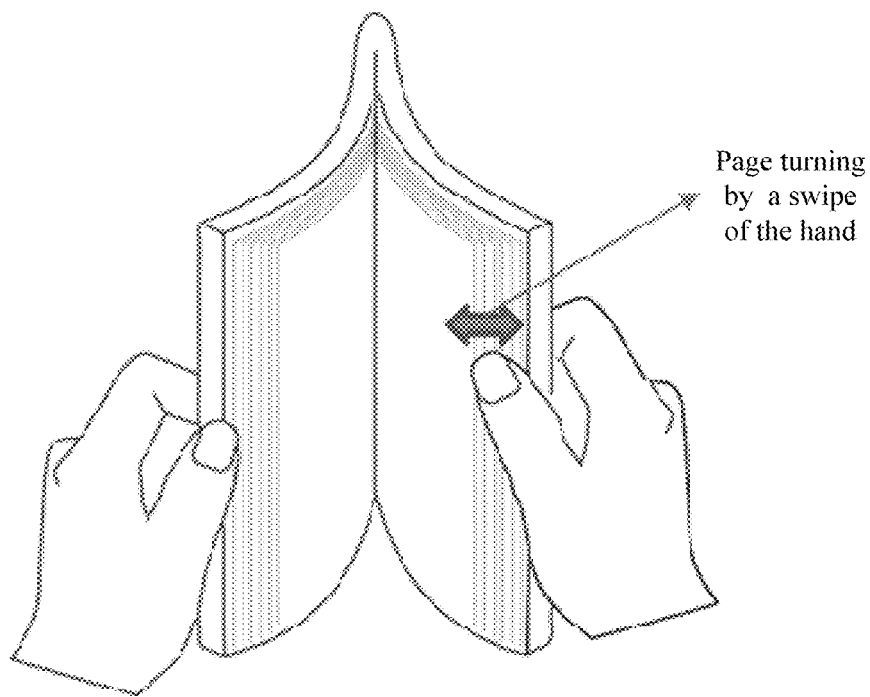
FIG. 19 is a schematic view of a flexible display screen in a partially unfolded state provided by an exemplary embodiment of the present disclosure.

For example, as illustrated in FIG. 19, an unfolding gesture is detected during reading, and a control member of the page turning is displayed on the visible area. According to a width of the visible area in a horizontal direction and the total number of pages of a book, the number of pages represented by a sliding distance of the finger is determined. For example, when the total number of pages of the book that the user is currently reading is 300, the total width of the visible area is 12 cm, the page of the book that the user is currently reading is on page 80, and it determines that the sliding distance of the user is 2 cm according to a distance detected by a distance sensor, then the corresponding number of the page turning is 50. In addition, a direction of the page turning can be set according to a sliding direction of the user's finger. For example, when the user's finger slides to the right, the book is turned backward to the 130th page. When the user's finger slides to the left, the book is turned forward to the 30th page.

For another example, when a multimedia application is applied to play a movie, a movie comment information, a setting of a volume subtitle, a movie control panel, and the like are displayed in response to turned gestures. When the multimedia application is applied to show an image, a control member adjusting the image, a sharing option, and the like are displayed in response to the turned gestures. When the multimedia application is applied to show an address book, a setting of a sorting order, a quick jump, and the like are displayed in response to the turned gestures. When the multimedia application is applied to a terminal home page, an app quick entry, a desktop widget, a real-time information, and the like are displayed in response to the turned gestures. For different application pages, different control members are set according to the shape of the visible area, and gesture operations is added, thus displaying different display contents, enriching the function of the flexible display screen, and improving the user's operating experience.

Figure 20:
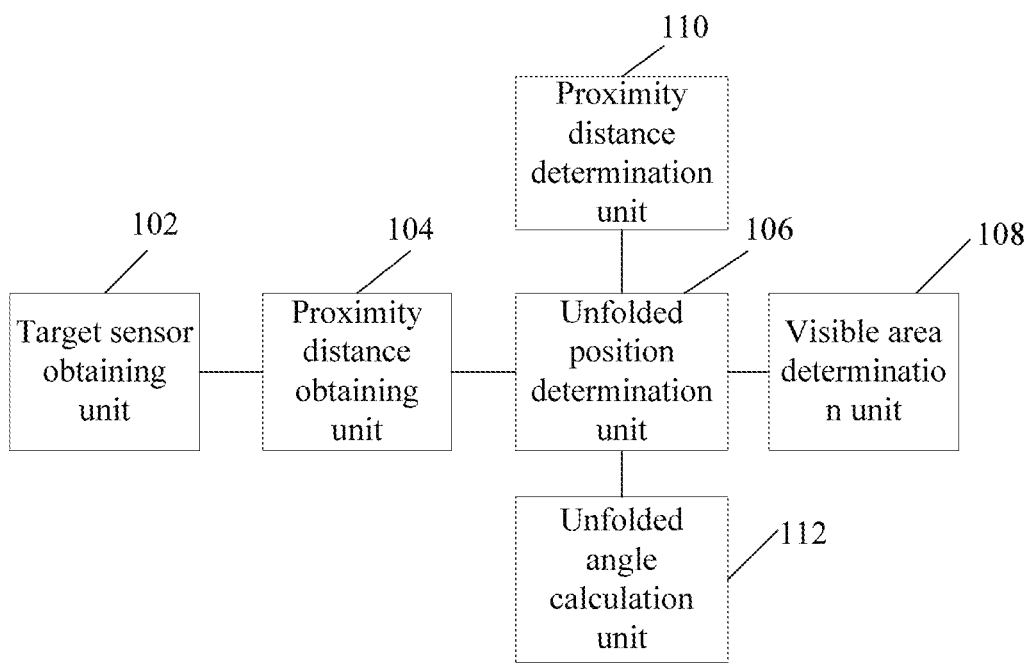
FIG. 20 is a structural schematic view of a device for controlling display of a flexible display screen provided by an exemplary embodiment of the present disclosure.

In addition, in an exemplary embodiment, a device for controlling display of a flexible display screen is also provided. As illustrated in FIG. 20, the device for controlling the display of the flexible display screen includes a target sensor obtaining unit 102, a proximity distance obtaining unit 104, an unfolded position determination unit 106, a visible area determination unit 108, a proximity distance determination unit 110, and an unfolded angle calculation unit 112.

The target sensor obtaining unit 102 is configured to traverse distance sensors in each detection sequence according to a sequence of the detection sequence, take each one as a target sensor, and obtain a front adjacent sensor in front of the target sensor and a rear adjacent sensor in the rear of the target sensor in the detection sequence.

The proximity distance obtaining unit 104 is configured to obtain a corresponding proximity distance that is a minimum value of distances from the set of distance sensors to each of the target sensor, the front adjacent sensor, and the rear adjacent sensor according to detected distances obtained from the target sensor and the front adjacent sensor and the rear adjacent sensor corresponding to the target sensor.

The unfolded position determination unit 106 is configured to, when the proximity distance of the target sensor is less than the proximity distance of the front adjacent sensor, and is less than or equal to the proximity distance of the rear adjacent sensor, determine an unfolded position according to the target sensor, and end the traversal.

The visible area determination unit 108 is configured to determine a visible area of the flexible display screen according to the unfolded position, and display a corresponding display content on the visible area of the flexible display screen.

Alternatively, the folded position corresponding to the target sensor includes a first unfolded position and a second unfolded position. The unfolded position determination unit 106 is further configured to obtain the first unfolded position where the target sensor is located among the detection sequence, and obtain the second unfolded position where the distance sensor corresponding to the proximity distance of the target sensor is located among the detection sequence of the corresponding distance sensor.

Alternatively, the visible area determination unit 108 is further configured to determine a first unfolded boundary according to the first unfolded position, determine a second unfolded boundary according to the second unfolded position. The first unfolded boundary is disjoint from the second unfolded boundary. the visible area determination unit 108 is further configured to determine a first visible area of the flexible display screen which is enclosed by the first unfolded boundary and the side edges of the flexible display screen; and determine a second visible area of the flexible display screen which is enclosed by the second unfolded boundary and the side edges of the flexible display screen as the visible area of the flexible display screen. The first visible area does not overlap with the second visible area.

Alternatively, the unfolded position determination unit 106 is further configured to, when the first unfolded position is less than a first sequence position threshold, determine the first unfolded position is invalid; or when the second unfolded position is greater than a second sequence position threshold, determine the second unfolded position is invalid.

Alternatively, the distance sensor corresponding to the proximity distance of the target sensor and the target sensor belong to the same detection sequence; or the distance sensor corresponding to the proximity distance of the target sensor and the target sensor belong to the different detection sequences.

Alternatively, the proximity distance determination unit 110 is configured to, when the distance sensor corresponding to the proximity distance of the front adjacent sensor is not the target sensor, determine whether the proximity distance of the front adjacent sensor is greater than a distance threshold, and if yes, perform the step of determining the unfolded position according to the target sensor.

Alternatively, the unfolded angle calculation unit 112 is configured to, when the distance sensor corresponding to the proximity distance of the front adjacent sensor is not the target sensor, calculate an unfolded angle according to the proximity distance of the front adjacent sensor and a distance between the front adjacent sensor and the target sensor, and when the unfolded angle is greater than an angle threshold, perform the step of determining the unfolded position according to the target sensor.

Alternatively, the visible area determination unit 108 is configured to calculate an area of the visible area; and when the area of the visible area is greater than or equal to a preset area threshold, perform the step of displaying the corresponding display content on the visible area of the flexible display screen.

In an exemplary embodiment of the present disclosure, distance sensors are uniformly distributed around the side edges or adjacent to the side edges of a flexible display screen. In an unfolded process of the flexible display screen, an unfolded position of an unfolded boundary is obtained by detected distances of the distance sensors, thus determining a visible area of the flexible display screen according to the unfolded position of the folding boundary and the unfolded direction. In the unfolded process of the flexible display screen, the visible area is gradually increased by unfolding the flexible display screen, the visible area is correspondingly displayed, the folded part of the flexible display screen is continuously unfolding, the visible area is gradually increased, a corresponding display area is also gradually increased, and a display function of the invisible area can be turned off, thus reducing energy consumption. In addition, a detection of unfolding the visible area can be combined with different functional interfaces, thus improving the user's operating experience.

Figure 21:
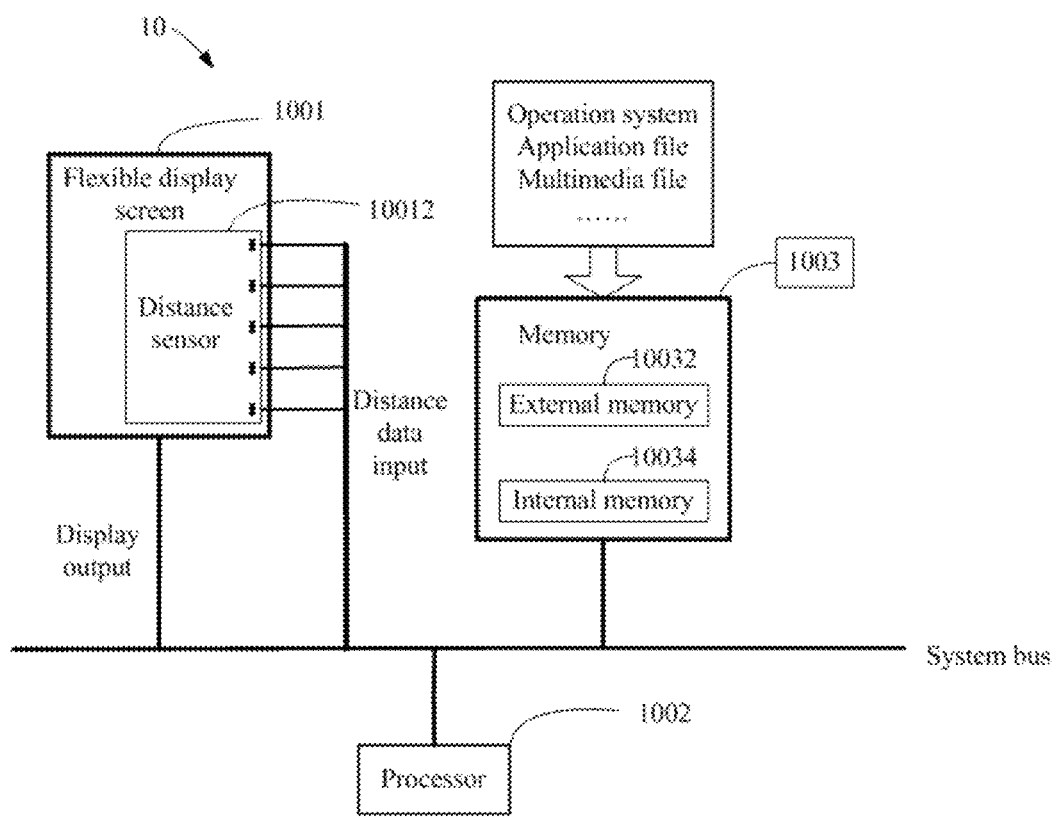
FIG. 21 is a hardware architecture view of a computer system operating the above method for controlling display of the flexible display screen provided by an exemplary embodiment of the present disclosure.

In an exemplary embodiment, as illustrated in FIG. 21, FIG. 21 illustrates a terminal device of a computer system 10 based on a von Neumann Computer system which operates the above method for controlling display of the flexible display screen. The computer system 10 can be a terminal device, such as a smart phone, a tablet, a palmtop, a laptop, or a personal computer. Specifically, the computer system 10 further includes a flexible display screen 1001, a processor 1002, and a memory 1003, which are connected with each other by a system bus. The flexible display screen 1001 can alternatively include at least a distance sensor 10012. The memory 1003 may include an external memory 10032 (such as, a hard disk, an optical disk, or a floppy disk) and an internal memory 10034. The processor 1002 is further configured to perform the above method for controlling the display of the flexible display screen. The method includes the following steps.

Distance sensors in each detection sequence is traversed according to a sequence of the detection sequence, each one is taken as a target sensor, and a front adjacent sensor in front of the target sensor and a rear adjacent sensor in rear of the target sensor is obtained in the detection sequence.

A corresponding proximity distance that is a minimum value of distances from the set of distance sensors to each of the target sensor, the front adjacent sensor, and the rear adjacent sensor is obtained according to detected distances obtained from the target sensor and the front adjacent sensor and the rear adjacent sensor corresponding to the target sensor.

When the proximity distance of the target sensor is less than the proximity distance of the front adjacent sensor, and is less than or equal to the proximity distance of the rear adjacent sensor, an unfolded position is determined according to the target sensor; and the traversal is ended.

A visible area of the flexible display screen is determined according to the unfolded position, and a corresponding display content is displayed on the visible area of the flexible display screen.

Alternatively, the unfolded position corresponding to the target sensor includes a first unfolded position and a second unfolded position. Determining the unfolded position according to the target sensor includes the following steps.

The first unfolded position where the target sensor is located among the detection sequence is obtained.

The second unfolded position where a distance sensor corresponding to the proximity distance of the target sensor is located among the detection sequence of the corresponding distance sensor is obtained.

Alternatively, determining the visible area of the flexible display screen according to the unfolded position includes the following steps.

A first unfolded boundary is determined according to the first unfolded position, a second unfolded boundary is determined according to the second unfolded position, and the first unfolded boundary is disjoint from the second unfolded boundary.

A first area visible area of the flexible display screen, which is enclosed by the first unfolded boundary and the side edges of the flexible display screen, is determined.

A second area visible area of the flexible display screen, which is enclosed by the second unfolded boundary and the side edges of the flexible display screen, is determined. The first visible area does not overlap with the second visible area.

Alternatively, determining the unfolded position according to the target sensor includes the following steps.

When the first unfolded position is less than a first sequence position threshold, the first unfolded position is determined to be invalid; or when the second unfolded position is greater than a second sequence position threshold, the second unfolded position is determined to be invalid.

Alternatively, the distance sensor corresponding to the proximity distance of the target sensor and the target sensor belong to the same detection sequence; or the distance sensor corresponding to the proximity distance of the target sensor and the target sensor belong to the different detection sequences.

Alternatively, before determining the unfolded position according to the target sensor, the method further includes the following steps.

When the distance sensor corresponding to the proximity distance of the front adjacent sensor is not the target sensor, it determines whether the proximity distance of the front adjacent sensor is greater than a distance threshold, and if yes, the step of determining the unfolded position according to the target sensor is performed.

Alternatively, before determining the unfolded position according to the target sensor, the method further includes the following steps.

When the distance sensor corresponding to the proximity distance of the front adjacent sensor is not the target sensor, an unfolded angle is calculated according to the proximity distance of the front adjacent sensor and a distance between the front adjacent sensor and the target sensor, and when the unfolded angle is greater than an angle threshold, the step of determining the unfolded position according to the target sensor is performed.

Alternatively, after determining the unfolded position according to the target sensor, the method further includes the following steps.

An area of the visible area is calculated.

When the area of the visible area is greater than or equal to a preset area threshold, the step of displaying the corresponding display content on the visible area of the flexible display screen is performed.

In the embodiment, the method is run based on the computer program. Program files of the computer program are stored in the external memory 10032 of the above computer system 10 based on a von Neumann Computer system, which are loaded into the internal memory 10034 at runtime, compiled into a machine code, and then transmitted to the processor 1002 for processing, thus forming the logical target sensor obtaining unit 102, proximity distance obtaining unit 104, unfolded position determination unit 106, visible area determination unit 108, proximity distance determination unit 110, and unfolded angle calculation unit 112 in the computer system 10 based on the von Neumann Computer system. In the implementation of the method for controlling display of the flexible display screen, a distance parameter obtained by the distance sensor is transmitted to the memory 1003 for caching, and then input to the processor 1002 for processing. The processed result data is cached in the memory 1003 for subsequent processing, or transmitted to the flexible display screen 1001 for display.

The above is only the preferable embodiment of the present disclosure, the scope of the present disclosure is not limited to thereof, and equivalent changes made in the claims of the present disclosure are still within the scope of the present disclosure.

What is claimed is:

1. A method for controlling display of a flexible display screen, which is performed by a processor; wherein the processor is coupled to a set of distance sensors distributed around side edges of the flexible display screen; the distance sensors are sequentially arranged around the side edges of the flexible display screen to form detection sequences corresponding to the side edges; the method comprises:

traversing the distance sensors in each of the detection sequences according to a sequence of the detection sequence, each being a target sensor, and obtaining a front adjacent sensor in front of the target sensor and a rear adjacent sensor in rear of the target sensor in the detection sequence;

obtaining a corresponding proximity distance that is a minimum value of distances from the set of distance sensors to each of the target sensor, the front adjacent sensor, and the rear adjacent sensor according to detected distances obtained from the target sensor and the front adjacent sensor and the rear adjacent sensor corresponding to the target sensor;

when the proximity distance of the target sensor is less than the proximity distance of the front adjacent sensor, and is less than or equal to the proximity distance of the rear adjacent sensor, determining an unfolded position according to the target sensor; and ending the traversal; and determining a visible area of the flexible display screen according to the unfolded position, and displaying a corresponding display content on the visible area of the flexible display screen.

2. The method of claim 1, wherein the unfolded position corresponding to the target sensor comprises a first unfolded position and a second unfolded position; and determining the unfolded position according to the target sensor comprises:

obtaining the first unfolded position where the target sensor is located among the detection sequence; and obtaining the second unfolded position where a distance sensor corresponding to the proximity distance of the target sensor is located among the detection sequence of the corresponding distance sensor.

3. The method of claim 2, wherein determining the visible area of the flexible display screen according to the unfolded position comprises:

determining a first unfolded boundary according to the first unfolded position, determining a second unfolded boundary according to the second unfolded position, wherein the first unfolded boundary is disjoint from the second unfolded boundary;

determining a first visible area of the flexible display screen which is enclosed by the first unfolded boundary and the side edges of the flexible display screen; and determining a second visible area of the flexible display screen which is enclosed by the second unfolded boundary and the side edges of the flexible display screen; wherein the first visible area does not overlap with the second visible area.

4. The method of claim 2, wherein determining the unfolded position according to the target sensor comprises:

when the first unfolded position is less than a first sequence position threshold, determining the first unfolded position is invalid; or when the second unfolded position is greater than a second sequence position threshold, determining the second unfolded position is invalid.

5. The method of claim 1, wherein the distance sensor corresponding to the proximity distance of the target sensor and the target sensor belong to the same detection sequence; or the distance sensor corresponding to the proximity distance of the target sensor and the target sensor belong to the different detection sequences.

6. The method of claim 1, wherein before determining the unfolded position according to the target sensor, the method further comprises:

when the distance sensor corresponding to the proximity distance of the front adjacent sensor is not the target sensor, determining whether the proximity distance of the front adjacent sensor is greater than a distance threshold, and if yes, performing the step of determining the unfolded position according to the target sensor.

7. The method of claim 1, wherein before determining the unfolded position according to the target sensor, the method further comprises:

when the distance sensor corresponding to the proximity distance of the front adjacent sensor is not the target sensor, calculating an unfolded angle according to the proximity distance of the front adjacent sensor and a distance between the front adjacent sensor and the target sensor, and when the unfolded angle is greater than an angle threshold, performing the step of determining the unfolded position according to the target sensor.

8. The method of claim 1, wherein after determining the unfolded position according to the target sensor, the method further comprises:

calculating an area of the visible area; and when the area of the visible area is greater than or equal to a preset area threshold, performing the step of displaying the corresponding display content on the visible area of the flexible display screen.

9. A device for controlling display of a flexible display screen, comprising:

a target sensor obtaining unit configured to traverse the distance sensors in each detection sequence according to a sequence of the corresponding detection sequence, take each one as a target sensor, and obtain a front adjacent sensor in front of the target sensor and a rear adjacent sensor in rear the target sensor in the corresponding detection sequence;

an proximity distance obtaining unit configured to obtain a corresponding proximity distance that is a minimum value of distances from the set of distance sensors to each of the target sensor, the front adjacent sensor, and the rear adjacent sensor according to detected distances obtained from the target sensor and the front adjacent sensor and the rear adjacent sensor corresponding to the target sensor;

an unfolded position determination unit configured to, when the proximity distance of the target sensor is less than the proximity distance of the front adjacent sensor, and is less than or equal to the proximity distance of the rear adjacent sensor, determine an unfolded position according to the target sensor; and end the traversal; and a visible area determination unit configured to determine a visible area of the flexible display screen according to the unfolded position, and display a corresponding display content on the visible area of the flexible display screen.

10. The device of claim 9, wherein the unfolded position corresponding to the target sensor comprises a first unfolded position and a second unfolded position; and the unfolded position determination unit is configured to obtain the first unfolded position where the target sensor is located among the detection sequence, and obtain the second unfolded position where the distance sensor corresponding to the proximity distance of the target sensor is located among the detection sequence of the corresponding distance sensor.

11. The device of claim 10, wherein the visible area determination unit is configured to determine a first unfolded boundary according to the first unfolded position, determine a second unfolded boundary according to the second unfolded position, and wherein the first unfolded boundary is disjoint from the second unfolded boundary; determine a first visible area of the flexible display screen which is enclosed by the first unfolded boundary and the side edges of the flexible display screen; and determine a second visible area of the flexible display screen which is enclosed by the second unfolded boundary and the side edges of the flexible display screen; wherein the first visible area does not overlap with the second visible area.

12. The device of claim 10, wherein the unfolded position determination unit is configured to, when the first unfolded position is less than a first sequence position threshold, determine the first unfolded position is invalid; or when the second unfolded position is greater than a second sequence position threshold, determine the second unfolded position is invalid.

13. The device of claim 9, wherein the distance sensor corresponding to the proximity distance of the target sensor and the target sensor belong to the same detection sequence; or the distance sensor corresponding to the proximity distance of the target sensor and the target sensor belong to the different detection sequences.

14. The device of claim 9, wherein the device further comprises a proximity distance determination unit, configured to, when the distance sensor corresponding to the proximity distance of the front adjacent sensor is not the target sensor, determine whether the proximity distance of the front adjacent sensor is greater than a distance threshold, and if yes, perform the step of determining the unfolded position according to the target sensor.

15. The device of claim 9, wherein the device further comprises an unfolded angle calculation unit configured to, when the distance sensor corresponding to the proximity distance of the front adjacent sensor is not the target sensor, calculate an unfolded angle according to the proximity distance of the front adjacent sensor and a distance between the front adjacent sensor and the target sensor, and when the unfolded angle is greater than an angle threshold, perform the step of determining the unfolded position according to the target sensor.

16. The device of claim 9, wherein the visible area determination unit is configured to calculate an area of the visible area; and when the area of the visible area is greater than or equal to a preset area threshold, perform the step of displaying the corresponding display content on the visible area of the flexible display screen.

* * * * *